S. OTIS.
HIGH SIDE GONDOLA CAR.
APPLICATION FILED DEC. 15, 1906.

985,926.

Patented Mar. 7, 1911.
3 SHEETS—SHEET 1.

S. OTIS.
HIGH SIDE GONDOLA CAR.
APPLICATION FILED DEC. 15, 1906.

985,926.

Patented Mar. 7, 1911.
3 SHEETS—SHEET 2.

Witnesses:
Inventor:
Spencer Otis,
By Thomas F. Sheridan
Att'y

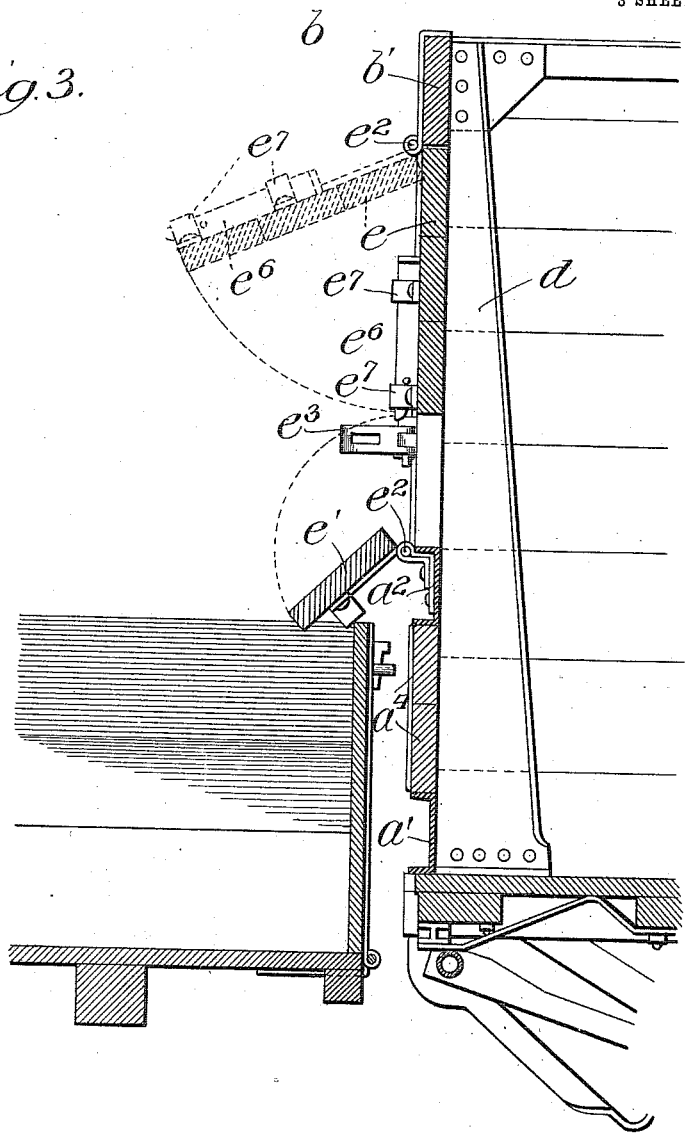

UNITED STATES PATENT OFFICE.

SPENCER OTIS, OF CHICAGO, ILLINOIS, ASSIGNOR TO NATIONAL DUMP CAR COMPANY, OF CHICAGO, ILLINOIS, A CORPORATION OF MAINE.

HIGH-SIDE GONDOLA CAR.

985,926.      Specification of Letters Patent.      Patented Mar. 7, 1911.

Application filed December 15, 1906. Serial No. 347,998.

*To all whom it may concern:*

Be it known that I, SPENCER OTIS, a citizen of the United States, residing at Chicago, in the county of Cook and State of Illinois, have invented certain new and useful Improvements in High-Side Gondola Cars, of which the following is a specification.

My invention relates to railway cars; and has for its object to provide a high side gondola car provided with means for discharging the load or a portion thereof through the sides of the car and for directing the discharge of the load to the desired point.

To this end my invention consists in the combinations and details hereinafter set forth and claimed.

Figure 1:
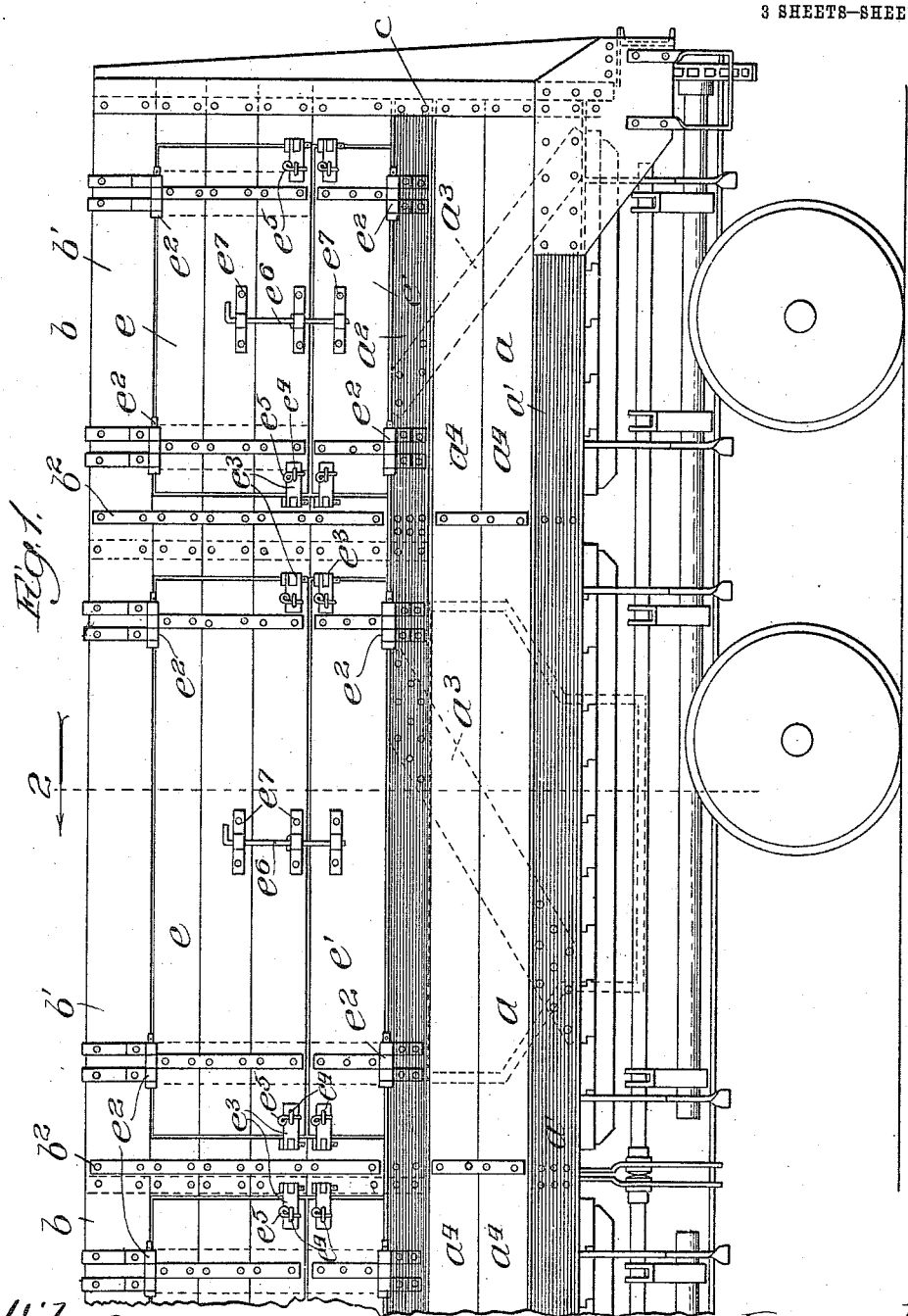
Figure 2:
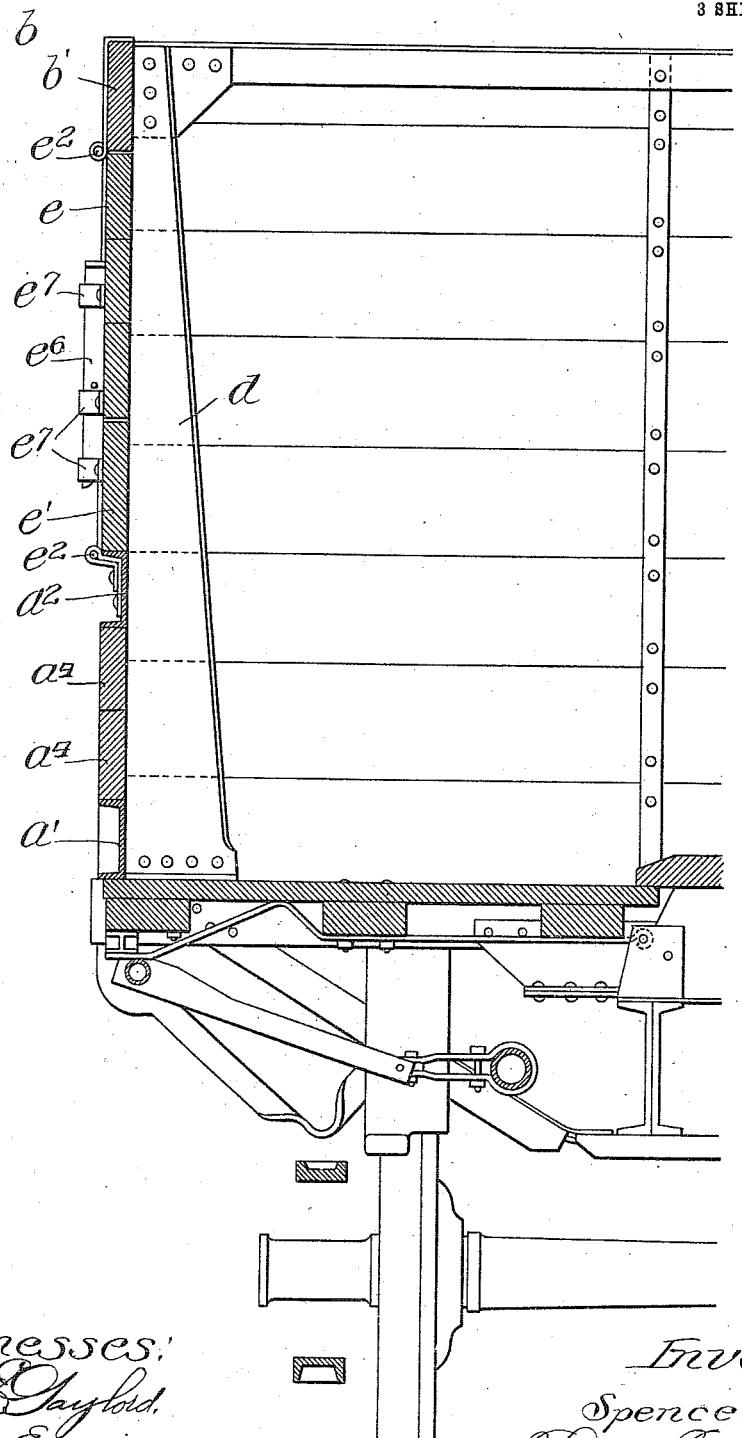

In the accompanying drawings—Figure 1 is a side elevation of a portion of a car embodying my invention. Fig. 2 is a transverse section on the line 2 of Fig. 1. Fig. 3 is a view similar to Fig. 2 showing the side doors in discharging position.

In the drawings, I have shown my improvements as applied to a car of the "National" type, these cars, as is well-known to those skilled in this art, being provided with a series of drop doors in the bottom of the car through which the load may be discharged. It is desirable to provide a car of the gondola type having high sides, whereby the length of the car may be somewhat decreased, while its load carrying capacity is maintained. It is difficult, however, with a car of this type to discharge the load therefrom entirely through the dumping doors in the bottom when the load is of closely compacted material, such as sand, gravel or like matter. It becomes necessary, therefore, to remove a part of the load from the car before the bottom dumping doors can be easily operated. It has been customary hitherto to remove part of the load by manual labor. I propose by my present invention to provide a means whereby the load may be discharged through the sides of the car and at the same time to provide a means whereby the load may be directed to a point outside the track or directly into wagons by means of which it may be conveyed to any desired point.

In carrying out my invention, I provide a car the sides of which comprise a lower load carrying portion and an upper or load retaining portion. The lower portion, I have shown as formed of two longitudinal sills $a'$, $a^2$ between which are secured boards $a^4$. The longitudinal sills $a'$, $a^2$, as shown, are formed of channel metal and extend throughout the length of the car from end to end thereof. These longitudinal sills are braced and strengthened by diagonal braces $a^3$, these braces, in connection with the sills, forming a trussed side for the car, these sides forming load sustaining members. I also provide inner side stakes $d$ extending the full length of the side of the car from top to the bottom thereof, these stakes being connected in the usual manner to the transverse members of the underframe.

Mounted above the lower or trussed side portion is a load retaining portion $b$ having an upper longitudinal member $b'$ extending continuously the entire length of the car, being connected at its ends to the end angle members $c$ and at intermediate points to the side stakes $d$. The load retaining sides are also braced by metallic straps $b^2$ extending from the upper longitudinal member $b$ to the upper member $a^2$ of the load sustaining portion of the side. This upper portion of the side is provided with a series of openings and in these openings are mounted a pair of doors, the upper door $e$ being hinged, as at $e^2$, to the upper longitudinal member $b'$ to swing upwardly and the lower door $e'$ being also connected by similar hinges $e^2$ to the upper longitudinal member of the load sustaining portion of the side so as to swing downwardly, as indicated in Fig. 3. Suitable retaining devices are provided, these being shown as hasps $e^3$ hinged adjacent the sides of the door which engage staples $e^4$ on the door and are retained thereon by pins or other retaining means $e^5$. I also provide as a further locking means, a bolt $e^6$ engaging staples $e^7$ on the upper and lower doors.

When it is desired to discharge a portion of the load through the sides of the car, the side doors are opened, the lower door swinging downwardly, so as to form an apron over which the load is discharged outwardly beyond the sides of the track, or if it is desired that the load be transferred into wagons, the lower door forms an apron over which the load is discharged and guided into the wagon, as will be readily understood and as shown in Fig. 3.

The operation of my car will be understood without further description.

I claim:

1. A high side gondola car having sides comprising a lower trussed load carrying portion and an upper load retaining portion, said upper portion being provided with a pair of load discharging doors, said doors comprising an upper door hinged to swing upwardly and a lower door hinged to swing downwardly.

2. A high side gondola car having sides comprising a lower trussed load carrying portion and an upper load retaining portion, said upper portion being provided with a pair of load discharging doors, said doors comprising an upper door hinged to swing upwardly and a lower door hinged to swing downwardly, and means to lock the doors in their closed position.

3. A high side gondola car having each side comprising a lower sill, an intermediate sill, diagonal braces between the same, and load retaining doors above the said intermediate sill.

SPENCER OTIS.

Witnesses:
JENNIE A. MACEDWARD,
ANNIE C. COURTENAY.

Copies of this patent may be obtained for five cents each, by addressing the "Commissioner of Patents, Washington, D. C."